US012725318B2

(12) United States Patent
Marri et al.

(10) Patent No.: US 12,725,318 B2
(45) Date of Patent: Sep. 1, 2026

(54) MULTILINGUAL TEXT-TO-IMAGE GENERATION

(71) Applicant: ADOBE INC., San Jose, CA (US)

(72) Inventors: Venkata Naveen Kumar Yadav Marri, Newark, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 391 days.

(21) Appl. No.: 18/296,002

(22) Filed: Apr. 5, 2023

(65) Prior Publication Data

US 2024/0338859 A1 Oct. 10, 2024

(51) Int. Cl.

| | |
|---|---|
| ***G06T 11/00*** | (2026.01) |
| ***G06F 40/58*** | (2020.01) |
| ***G06V 10/74*** | (2022.01) |
| ***G06V 10/774*** | (2022.01) |
| ***G06V 10/82*** | (2022.01) |

(52) U.S. Cl.

CPC .............. *G06T 11/00* (2013.01); *G06F 40/58* (2020.01); *G06V 10/74* (2022.01); *G06V 10/774* (2022.01); *G06V 10/82* (2022.01)

(58) Field of Classification Search

CPC .......... G06T 11/00; G06F 40/58; G06F 40/30; G06V 10/74; G06V 10/774; G06V 10/82

USPC .................................... 704/8, 231, 235, 239

See application file for complete search history.

(56) References Cited

U.S. PATENT DOCUMENTS 10,713,821 B1 7/2020 Surya et al.
11,216,505 B2 1/2022 Motiian et al.
11,922,550 B1 3/2024 Ramesh et al.
11,995,803 B1 * 5/2024 Karpman .................. G06T 5/70
2011/0069325 A1 3/2011 Kawashima et al.
2022/0343561 A1 10/2022 Aggarwal et al.
2023/0118966 A1 * 4/2023 Liu ......................... G06F 40/30 345/473
2024/0112088 A1 * 4/2024 Yu .......................... G06N 20/00
2024/0153152 A1 * 5/2024 Liu ........................... G06T 5/70
2024/0185035 A1 * 6/2024 Yu ........................ G06N 3/0455

(Continued)

OTHER PUBLICATIONS

Office Action dated Apr. 29, 2025 in related U.S. Appl. No. 18/329,111.

(Continued)

*Primary Examiner* — George C Monikang

(74) *Attorney, Agent, or Firm* — F. CHAU & ASSOCIATES, LLC

(57) ABSTRACT

Systems and methods for image processing are provided. One aspect of the systems and methods includes obtaining a text prompt in a first language. Another aspect of the systems and methods includes encoding the text prompt using a multilingual encoder to obtain a multilingual text embedding. Yet another aspect of the systems and methods includes processing the multilingual text embedding using a diffusion prior model to obtain an image embedding, wherein the diffusion prior model is trained to process multilingual text embeddings from the first language and a second language based on training data from the first language and the second language. Yet another aspect of the systems and methods includes generating an image using a diffusion model based on the image embedding, wherein the image includes an element corresponding to the text prompt.

20 Claims, 12 Drawing Sheets

(56) References Cited

U.S. PATENT DOCUMENTS

| | | | |
|---|---|---|---|
| 2024/0282131 A1 | 8/2024 | Ren et al. | |
| 2024/0303764 A1* | 9/2024 | Pang | G06T 11/00 |
| 2024/0331235 A1 | 10/2024 | Smock et al. | |

OTHER PUBLICATIONS

Office Action dated May 19, 2025 in related U.S. Appl. No. 18/301,671.
Li, et al., "Universal Style Transfer via Feature Transforms", 31st Conference on Neural Information Processing Systems (NIPS 2017), 11 pages.
Radford, et al., "Learning Transferable Visual Models From Natural Language Supervision", In International Conference on Machine Learning (pp. 8748-8763), PMLR, arXiv preprint: arXiv:2103.00020v1 [cs.CV] Feb. 26, 2021.
Rramesh, et al., "Hierarchical Text-Conditional Image Generation with CLIP Latents", arXiv preprint: arXiv:2204.06125v1 [cs.CV] Apr. 13, 2022, 27 pages.
Rombach, et al., "High-Resolution Image Synthesis with Latent Diffusion Models", In Proceedings of the IEEE/CVF Conference on Computer Vision and Pattern Recognition (pp. 10684-10695), arXiv preprint: arXiv:2112.10752v2 [cs.CV] Apr. 13, 2022.
Saharia, et al., "Photorealistic Text-to-Image Diffusion Models with Deep Language Understanding", arXiv preprint: arXiv:2205.11487v1 [cs.CV] May 23, 2022, 46 pages.
Align: Scaling Up Visual and Vision-Language Representation Learning With Noisy Text Supervision. Tuesday, May 11, 2021. Posted by Chao Jia and Yinfei Yang, Software Engineers, Google Research. Found on the internet at: https://ai.googleblog.com/2021/05/align-scaling-up-visual-and-vision.html.
GitHub—FreddeFrallan/Multilingual-CLIP: OpenAI CLIP text encoders for multiple languages, 7 pages. Found on the Internet, https://github.com/FreddeFrallan/Multilingual-CLIP#readme.
Office Action dated Sep. 18, 2025 in related U.S. Appl. No. 18/319,111.

* cited by examiner

English Prompt:
*Wood aged art architecture texture abstract block stack on the wall for background, Abstract colorful wood texture for backdrop.*

305

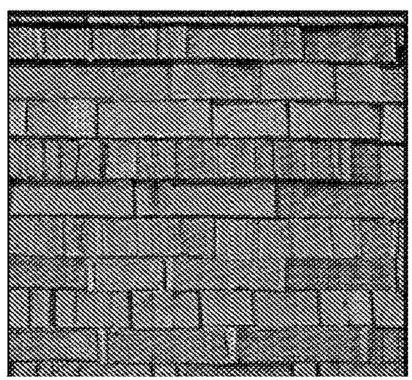

German Prompt:
*Holzgealterte Kunstarchitektur Textur abstrakten Block Stapel auf der Wand für Hintergrund, Abstrakte farbenfrohe Holzstruktur für Hintergrund*

310

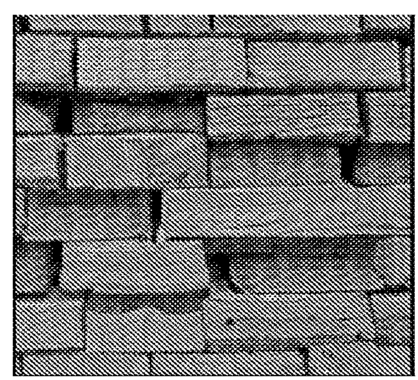

French Prompt:
*Architecture d'art vieilli en bois texture bloc abstrait empilement sur le mur pour fond, Résumé texture de bois coloré pour fond.*

315

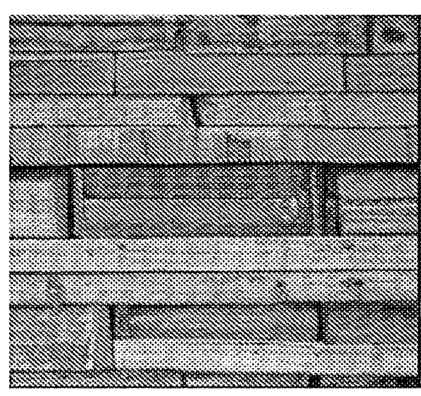

FIG. 3

MULTILINGUAL TEXT-TO-IMAGE GENERATION

BACKGROUND

The following relates generally to machine learning, and more specifically to machine learning for image processing.

Digital image processing refers to the process of making changes to a digital image using a computer or other electronic device. A computer or other electronic device may use an algorithm, a processing network, etc. to make changes to a digital image. In some cases, image processing software may be used for various image processing tasks, such as image editing, image generation, etc. Some image processing systems may implement machine learning techniques, for example, to perform tasks using predictive models (e.g., without explicitly programming the system for each task), to perform tasks with more accuracy or in less time, to perform tasks using special-purpose hardware, etc.

Image generation (a subfield of digital image processing) may include using a machine learning model to generate images. In some cases, image generation may depend on signals from users via user prompts (e.g., commands). The user prompts may condition the image generation process to output generated images that have certain attributes (e.g., content, color, style, object locations). This process may be referred to as conditional image generation. In some examples, a machine learning model (e.g., a diffusion-based image generation model) may be used for conditional image generation.

SUMMARY

The present disclosure describes systems and methods for image processing. Embodiments of the present disclosure include an image processing apparatus configured to generate an image based on a text prompt written in any of multiple languages. The image processing apparatus may generate a multilingual text embedding based on a text prompt, generate an image embedding based on the multilingual text embedding, and use the image embedding as guidance to generate an image corresponding to the text prompt. The image processing apparatus may be trained to generate image embeddings from multilingual text embeddings that correspond to text prompts in multiple languages. Thus, at inference time, a user may be able to choose any of the multiple languages to provide a prompt to the image processing apparatus for an image.

A method, apparatus, non-transitory computer readable medium, and system for machine learning for image processing are described. One or more aspects of the method, apparatus, non-transitory computer readable medium, and system include obtaining a text prompt in a first language; encoding the text prompt using a multilingual encoder to obtain a multilingual text embedding; processing the multilingual text embedding using a diffusion prior model to obtain an image embedding, wherein the diffusion prior model is trained to process multilingual text embeddings from the first language and a second language based on training data from the first language and the second language; and generating an image using a diffusion model based on the image embedding, wherein the image includes an element corresponding to the text prompt.

A method, apparatus, non-transitory computer readable medium, and system for machine learning for image processing are described. One or more aspects of the method, apparatus, non-transitory computer readable medium, and system include obtaining training data including a plurality of images, a first plurality of image captions in a first language, and a second plurality of image captions in a second language; encoding the first plurality of image captions and the second plurality of image captions using a multilingual encoder to obtain a plurality of multilingual text embeddings; processing the plurality of multilingual text embeddings using a diffusion prior model to obtain a plurality of predicted image embeddings corresponding to the first plurality of image captions in the first language and the second plurality of image captions in the second language; and training the diffusion prior model to generate image embeddings based on multilingual text embeddings from the first language and the second language, wherein the diffusion prior model is trained based on the plurality of predicted image embeddings and the plurality of images.

An apparatus, system, and method for machine learning for image processing are described. One or more aspects of the apparatus, system, and method include at least one memory component and at least one processing device coupled to the at least one memory component. The processing device may be configured to execute instructions stored in the at least one memory component to perform operations including: processing, using a diffusion prior model, a multilingual text embedding from a first language to obtain an image embedding, wherein the diffusion prior model is trained to process multilingual text embeddings from the first language and a second language based on training data from the first language and the second language and generating, using a diffusion model, an image based on the image embedding, where the image includes an element corresponding to the multilingual text embedding.

BRIEF DESCRIPTION OF THE DRAWINGS

FIG. 3 shows examples of multilingual text prompts and corresponding images generated by an image processing apparatus according to aspects of the present disclosure.

DETAILED DESCRIPTION

Figure 1:
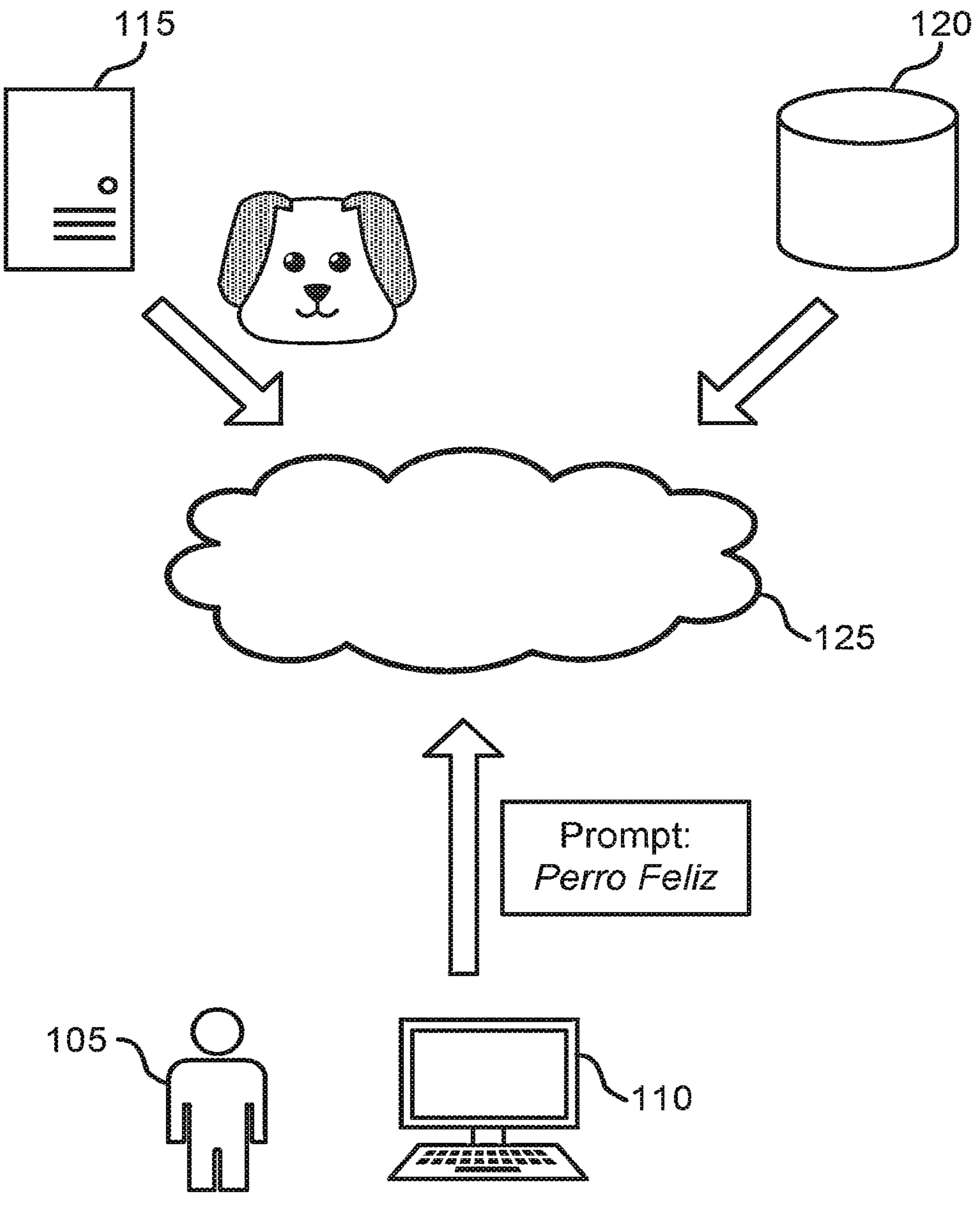
FIG. 1 shows an example of an image processing system according to aspects of the present disclosure.

The present disclosure describes systems and methods for image processing. Embodiments of the present disclosure include an image processing apparatus configured to generate an image based on a text prompt written in any of multiple languages. The image processing apparatus may generate a multilingual text embedding based on a text prompt, generate an image embedding based on the multilingual text embedding, and use the image embedding as guidance to generate an image corresponding to the text prompt. The image processing apparatus may be trained to generate image embeddings from multilingual text embeddings that correspond to text prompts in multiple languages. Thus, at inference time, a user may be able to choose any of the multiple languages to provide a prompt to the image processing apparatus for an image.

Some image generation models (e.g., diffusion-based generation models) may support conditional image generation to allow a user to specify one or more conditions for generating an image. The one or more conditions may correspond to image features in a latent space that may guide an image generation model to generate an image with the image features. In some examples, the one or more conditions may be specified by a user using natural language text. The natural language text may be tokenized and mapped to one or more vectors in the latent space of the image generation model. In some examples, however, an image generation model may only accept natural language text written in a single language (e.g., English) as input. In such examples, the image generation model may not be accessible to non-English speakers, and a userbase of the image generation model may be restricted.

Embodiments of the present disclosure include an image processing apparatus configured to generate an image based on a text prompt written in any (e.g., one) of multiple languages. The image processing apparatus may include a multilingual encoder, a diffusion prior model, and a diffusion model. The multilingual encoder may generate a multilingual text embedding based on the text prompt, the diffusion prior model may generate an image embedding based on the multilingual text embedding, and the diffusion model may use the image embedding as guidance to generate an image corresponding to the text prompt. In some examples, the diffusion prior model may generate multiple image embeddings based on a multilingual text embedding, and the image processing apparatus may select an image embedding to pass to the diffusion model based on a similarity between the image embedding and the multilingual text embedding.

To allow for multilingual text to image generation, the diffusion prior model of the image processing apparatus may be trained to generate image embeddings based on text prompts written in multiple languages. Training data for training the diffusion prior model may include images paired with captions written in multiple languages. To produce the training data, an English caption paired with an image may be translated to other languages, and the captions in the other languages may be paired with the same image as the English caption or with different images. In some examples, the diffusion prior model may be trained based on a comparison of image embeddings predicted by the diffusion prior model and ground-truth image embeddings corresponding to training images. In other examples, the diffusion prior model may be trained based on a comparison of images predicted by the image processing apparatus and training images.

Because the image processing apparatus may be capable of generating images based on text prompts written in multiple languages, an application using the image processing apparatus may be accessible to a wide range of users (e.g., English and non-English speakers). Further, because captions in different languages may be paired with different images despite being translated from a single caption (e.g., an English caption), the image processing apparatus may be trained to account for slight idiosyncrasies in different languages when generating images for the different languages. Details regarding the architecture of an example image processing apparatus are provided with reference to FIGS. 1-4. Example processes for image processing are provided with reference to FIGS. 5-9. Example training processes are described with reference to FIGS. 10 and 11.

Network Architecture

In FIGS. 1-4, a system for machine learning for image processing is described. The system includes at least one memory component and at least one processing device coupled to the at least one memory component. The processing device is configured to execute instructions stored in the at least one memory component to perform operations including: processing, using a diffusion prior model, a multilingual text embedding from a first language to obtain an image embedding, wherein the diffusion prior model is trained to process multilingual text embeddings from the first language and a second language based on training data from the first language and the second language, and generating, using a diffusion model, an image based on the image embedding, wherein the image includes an element corresponding to the multilingual text embedding.

In some aspects, the at least one processing device is configured to execute instructions stored in the at least one memory component to perform operations including encoding, using a multilingual encoder, a text prompt in the first language to obtain the multilingual text embedding.

In some aspects, the multilingual encoder includes a multimodal encoder for text and images.

In some aspects, the at least one processing device is configured to execute instructions stored in the at least one memory component to perform operations including training the diffusion prior model to generate image embeddings based on multilingual text embeddings from the first language and the second language, wherein the diffusion prior model is trained based on a plurality of predicted images.

In some aspects, the image embedding is in a same embedding space as the multilingual text embedding.

In some aspects, the diffusion prior model includes a transformer architecture.

In some aspects, the diffusion model includes a UNet architecture.

FIG. 1 shows an example of an image processing system 100 according to aspects of the present disclosure. The image processing system 100 includes user 105, computing device 110, image processing apparatus 115, database 120, and cloud 125. The image processing apparatus 115 is an example of, or includes aspects of, the corresponding element described with reference to FIG. 2.

A user 105 may interact with image generation software on user device 110. The user device 110 may communicate with the image processing apparatus 115, which may be located on the cloud 125. In some examples, the user 105 may provide a prompt in any of multiple languages to the image processing apparatus 115 via the user device 110, and the image processing apparatus 115 may generate an image based on the prompt. The image processing apparatus 115 may then provide the image to the user device 110 for the user 105.

The image processing apparatus 115 may be capable of generating images based on text prompts written in multiple languages (e.g., English, German, French, Japanese). For instance, the image processing apparatus 115 may generate an image based on an English text prompt, a German text prompt, a French text prompt, or a Japanese text prompt. The image processing apparatus may learn an embedding mapping function from text embeddings (e.g., multilingual, multimodal text embeddings) to image embeddings to improve the quality of generated images (e.g., since the images may be generated from the image embeddings rather than the text embeddings). A single model (e.g., machine learning model) of the image processing apparatus 115 may be trained for multilingual text to image generation such that hosting costs for the model may be minimal. Further, because a single model may be used to generate images based on text prompts written in multiple languages, there may be consistency in the images generated across different languages.

Multilingual, multimodal text embeddings may be extracted from parallel image captions to train the image processing apparatus 115 to map multilingual, multimodal text embeddings to image embeddings. A dataset including images and corresponding captions may be expanded (e.g., for training the image processing apparatus 115) by translating each of the captions to different languages and pairing the translated captions with a corresponding image in the dataset or with different images. Thus, for each English caption in a dataset, parallel translations may be created to train the image processing apparatus 115. The parallel translations (e.g., German, French, and Japanese translations) may be generated using a translation service. In some examples, even if the parallel translations are imperfect (e.g., based on being generated by a model), the image processing apparatus 115 may use the translations as weak supervision to learn generic text to image representations for different languages. Thus, using a single model, the image processing apparatus 115 may generate consistent images from text prompts across multiple languages (e.g., English, German, French, Japanese). That is, using system translated captions (e.g., which are often noisy), the image processing apparatus 115 may generate consistent images for the same caption across all languages.

In some examples, the image processing apparatus 115 may include a server. A server provides one or more functions to users 105 linked by way of one or more of the various networks. In some cases, the server includes a single microprocessor board, which includes a microprocessor responsible for controlling all aspects of the server. In some cases, a server uses microprocessor and protocols to exchange data with other devices/users 105 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device 110, a personal computer, a laptop computer, a mainframe computer, a super computer, or any other suitable processing apparatus.

A database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 105 interacts with database 120 controller. In other cases, database 120 controller may operate automatically without user 105 interaction.

A cloud 125 is a computer network configured to provide on-demand availability of computer system resources, such as data storage and computing power. In some examples, the cloud 125 provides resources without active management by the user 105. The term cloud 125 is sometimes used to describe data centers available to many users 105 over the Internet. Some large cloud 125 networks have functions distributed over multiple locations from central servers. A server is designated an edge server if it has a direct or close connection to a user 105. In some cases, a cloud 125 is limited to a single organization. In other examples, the cloud 125 is available to many organizations. In one example, a cloud 125 includes a multi-layer communications network comprising multiple edge routers and core routers. In another example, a cloud 125 is based on a local collection of switches in a single physical location.

A computing device 110 is a personal computer, laptop computer, mainframe computer, palmtop computer, personal assistant, mobile device, or any other suitable processing apparatus. In one aspect, image processing system 100 includes user 105, computing device 110, image processing apparatus 115, database 120, and cloud 125. Image processing apparatus 115 is an example of, or includes aspects of, the corresponding element described with reference to FIG. 2.

Figure 2:
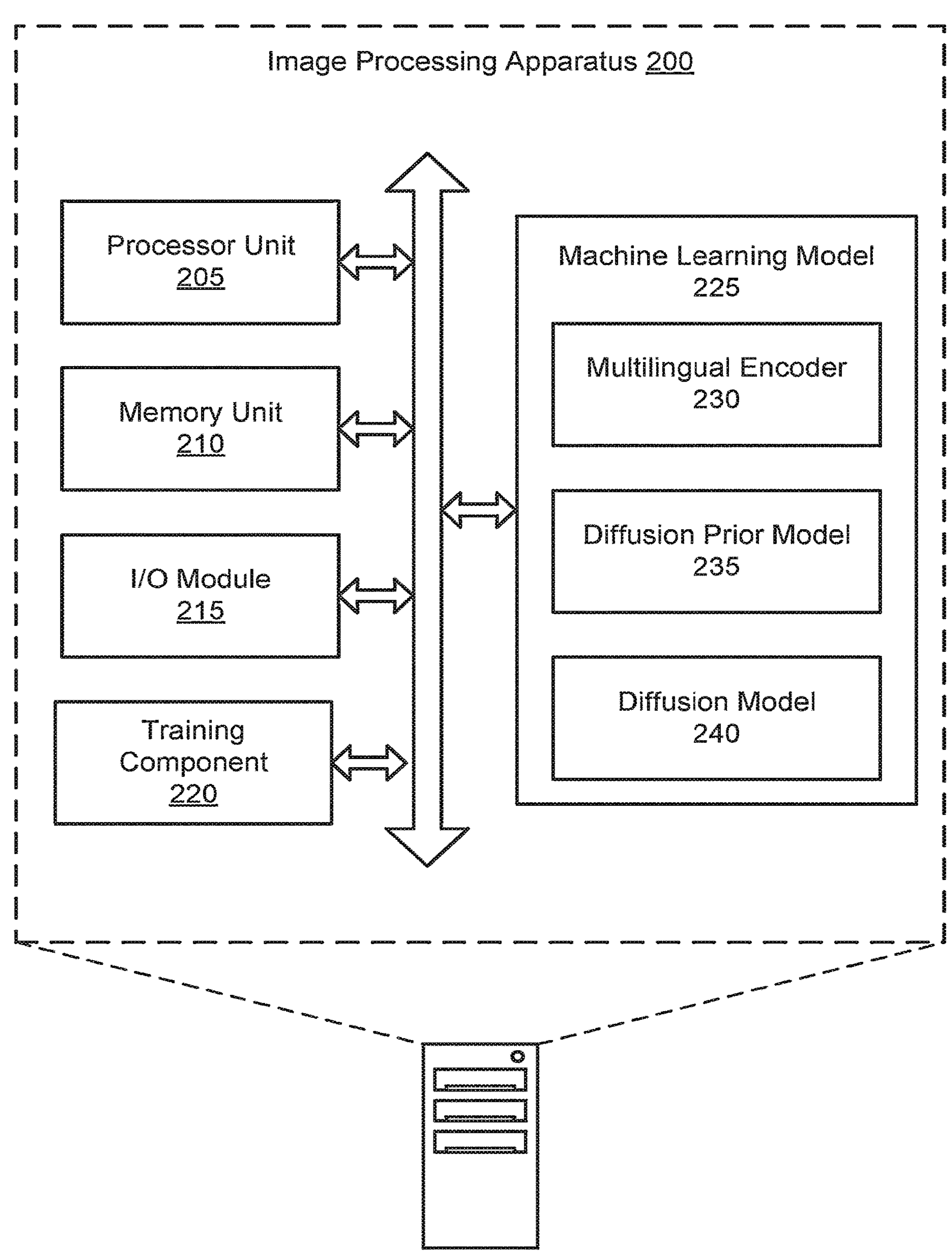
FIG. 2 shows an example of an image processing apparatus according to aspects of the present disclosure.

FIG. 2 shows an example of an image processing apparatus 200 according to aspects of the present disclosure. The image processing apparatus 200 includes processor unit 205, memory unit 210, I/O module 215, training component 220, and machine learning model 225. The machine learning model 225 includes multilingual encoder 230, diffusion prior model 235, and diffusion model 240. Image processing apparatus 200 is an example of, or includes aspects of, the corresponding element described with reference to FIG. 1.

Processor unit 205 comprises a processor. Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 205 is configured to operate a memory array using a memory controller. In other cases, a memory controller is integrated into the processor unit 205. In some cases, the processor unit 205 is configured to execute computer-readable instructions stored in a memory to perform various functions. In some embodiments, a processor unit 205 includes special purpose components for modem processing, baseband processing, digital signal processing, or transmission processing.

Memory unit 210 comprises a memory including instructions executable by the processor. Examples of a memory unit 210 include random access memory (RAM), read-only memory (ROM), or a hard disk. Examples of memory units 210 include solid state memory and a hard disk drive. In some examples, memory is used to store computer-readable, computer-executable software including instructions that, when executed, cause a processor to perform various functions described herein. In some cases, the memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote-control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

In some examples, image processing apparatus 200 includes a computer-implemented artificial neural network (ANN) to generate classification data for a set of samples. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

In some examples, image processing apparatus 200 includes a computer-implemented convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some examples, image processing apparatus 200 includes a transformer. A transformer or transformer network is a type of neural network model used for natural language processing tasks. A transformer network transforms one sequence into another sequence using an encoder and a decoder. The encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes attention mechanism, where the attention looks at an input sequence and decides at each step which other parts of the sequence are important. The attention mechanism involves query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence than Q. However, for the attention module that is taking into account the encoder and the decoder sequences, V is different from the sequence represented by Q. In some cases, values in V are multiplied and summed with some attention-weights a.

In some examples, the multilingual encoder 230 is a multilingual, multimodal encoder, such as a contrastive language-image pre-training (CLIP) encoder. CLIP is a neural network-based model that is trained on a massive dataset of images and text (e.g., image captions). CLIP uses a technique called contrastive learning to learn underlying patterns and features of data. Contrastive learning allows CLIP to understand the relationships between different objects and scenes in images, and to classify them based on their content. CLIP is multimodal in that it can process and understand multiple types of data inputs, such as text and images. In some examples, CLIP can be fine-tuned for specific tasks, such as recognizing specific objects in images. CLIP's ability to generalize from one task to another and to be fine-tuned for new tasks makes it a highly versatile model.

According to some aspects, multilingual encoder 230 (e.g., a multimodal encoder for text and images) obtains a text prompt in a first language. In some examples, multilingual encoder 230 encodes the text prompt to obtain a multilingual text embedding. According to some aspects, diffusion prior model 235 (e.g., a transformer architecture) processes the multilingual text embedding to obtain an image embedding, where the diffusion prior model 235 is trained to process multilingual text embeddings from the first language and a second language based on training data from the first language and the second language. According to some aspects, diffusion model 240 (e.g., a UNet architecture) generates an image using a diffusion model 240 based on the image embedding, where the image includes an element corresponding to the text prompt.

In some examples, multilingual encoder 230 obtains an additional text prompt in the second language. In some examples, multilingual encoder 230 encodes the additional text prompt using the multilingual encoder 230 to obtain an additional multilingual text embedding. In some examples, diffusion prior model 235 processes the additional multilingual text embedding using the diffusion prior model 235 to obtain an additional image embedding. In some examples, diffusion model 240 generates an additional image based on the additional image embedding, where the additional image includes an additional element corresponding to the additional text prompt.

In some examples, diffusion prior model 235 generates a set of intermediate image embeddings corresponding to a set of diffusion time steps, where the image is generated based on the set of intermediate image embeddings.

In some examples, diffusion prior model 235 obtains a causal attention mask, where the image embedding is generated based on the causal attention mask.

In some examples, diffusion prior model 235 generates a set of image embeddings. According to some aspects, machine learning model 225 computes a similarity score between each of the set of image embeddings and the multilingual text embedding. In some examples, machine learning model 225 selects the image embedding from the set of image embeddings based on the similarity score.

In some aspects, the image embedding is in a same embedding space as the multilingual text embedding.

According to some aspects, training component 220 obtains training data including a set of images, a first set of image captions in a first language, and a second set of image captions in a second language. According to some aspects, multilingual encoder 230 encodes the first set of image captions and the second set of image captions using a multilingual encoder 230 to obtain a set of multilingual text embeddings. According to some aspects, diffusion prior model 235 processes the set of multilingual text embeddings to obtain a set of predicted image embeddings corresponding to the first set of image captions in the first language and the second set of image captions in the second language. In some examples, training component 220 trains the diffusion prior model 235 to generate image embeddings based on multilingual text embeddings from the first language and the second language, where the diffusion prior model 235 is trained based on the set of predicted image embeddings and the set of images.

In some examples, training component 220 identifies a set of ground-truth image embeddings corresponding to the set of images, respectively. In some examples, training component 220 compares the set of predicted image embeddings to the set of ground-truth image embeddings, where the diffusion prior model 235 is trained based on the comparison.

According to some aspects, diffusion model 240 generates a set of predicted images based on the set of predicted image embeddings using a diffusion model 240. In some examples, training component 220 compares the set of predicted images to the set of images, respectively, where the diffusion prior model 235 is trained based on the comparison.

In some aspects, the diffusion model 240 is pretrained prior to training the diffusion prior model 235.

In some examples, training component 220 translates the first set of image captions to obtain the second set of image captions.

In some aspects, the set of images includes a first subset of images corresponding to the first language and a second subset of images corresponding to the second language, the first subset of images being different from the second subset of images.

In some aspects, the multilingual encoder 230 is pre-trained prior to training the diffusion prior model 235.

FIG. 3 shows examples of multilingual text prompts and corresponding images generated by an image processing apparatus according to aspects of the present disclosure. Multilingual text prompts may refer to text prompts written in multiple languages (i.e., a group of text prompts with at least one text prompt written in a first language and another text prompt written in a second language). In a first example 305, an image processing apparatus may generate an image based on an English prompt. In a second example 310, an image processing apparatus may generate an image based on a German prompt. In a third example 315, an image processing apparatus may generate an image based on a French prompt. The English prompt in the first example 305 may be translated to generate the German prompt in the second example 310 and the French prompt in the third example 315. Images generated by an image processing apparatus may vary for prompts in different languages (e.g., even if the prompts include translations of the same text).

Figure 4:
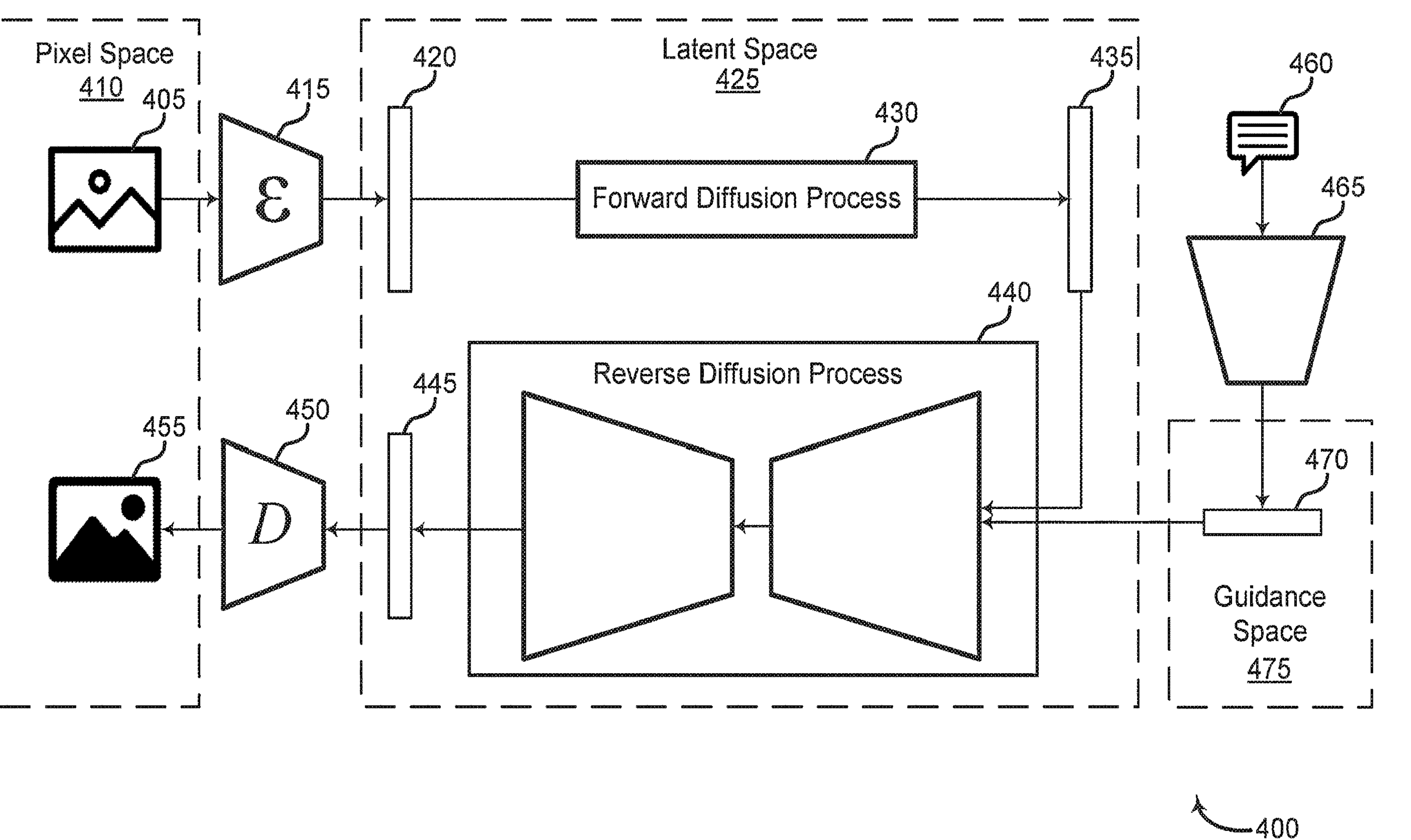
FIG. 4 shows an example of a guided latent diffusion model according to aspects of the present disclosure.

FIG. 4 shows an example of a guided latent diffusion model according to aspects of the present disclosure. The guided latent diffusion model 400 depicted in FIG. 4 is an example of, or includes aspects of, the diffusion model 240 described with reference to FIG. 2. The guided latent diffusion model 400 may generate an image using an image embedding from a diffusion prior model as guidance.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text or other guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 400 may take an original image 405 in a pixel space 410 as input and apply an image encoder 415 to convert original image 405 into original image features 420 in a latent space 425. Then, a forward diffusion process 430 gradually adds noise to the original image features 420 to obtain noisy features 435 (also in latent space 425) at various noise levels.

Next, a reverse diffusion process 440 (e.g., a U-Net ANN) gradually removes the noise from the noisy features 435 at the various noise levels to obtain denoised image features 445 in latent space 425. In some examples, the denoised image features 445 are compared to the original image features 420 at each of the various noise levels, and parameters of the reverse diffusion process 440 of the diffusion model are updated based on the comparison. Finally, an image decoder 450 decodes the denoised image features 445 to obtain an output image 455 in pixel space 410. In some cases, an output image 455 is created at each of the various noise levels. The output image 455 can be compared to the original image 405 to train the reverse diffusion process 440.

In some cases, image encoder 415 and image decoder 450 are pre-trained prior to training the reverse diffusion process 440. In some examples, they are trained jointly, or the image encoder 415 and image decoder 450 are fine-tuned jointly with the reverse diffusion process 440.

The reverse diffusion process 440 can also be guided based on a text prompt 460, or another guidance prompt, such as an image, a layout, a segmentation map, etc. The text prompt 460 can be encoded using a text encoder 465 (e.g., a multimodal encoder) to obtain guidance features 470 in guidance space 475. The guidance features 470 can be combined with the noisy features 435 at one or more layers of the reverse diffusion process 440 to ensure that the output image 455 includes content described by the text prompt 460. For example, guidance features 470 can be combined with the noisy features 435 using a cross-attention block within the reverse diffusion process 440.

Image Processing

In FIGS. 5-9, a method, apparatus, non-transitory computer-readable medium, and system for machine learning for image processing are described. One or more aspects of the method, apparatus, non-transitory computer-readable medium, and system include obtaining a text prompt in a first language; encoding the text prompt using a multilingual encoder to obtain a multilingual text embedding; processing the multilingual text embedding using a diffusion prior model to obtain an image embedding, wherein the diffusion prior model is trained to process multilingual text embeddings from the first language and a second language based on training data from the first language and the second language; and generating an image using a diffusion model based on the image embedding, wherein the image includes an element corresponding to the text prompt.

Some examples of the method, apparatus, non-transitory computer readable medium, and system further include obtaining an additional text prompt in the second language. Some examples further include encoding the additional text prompt using the multilingual encoder to obtain an additional multilingual text embedding. Some examples further include processing the additional multilingual text embedding using the diffusion prior model to obtain an additional image embedding. Some examples further include generating an additional image using the diffusion model based on the additional image embedding, wherein the additional image includes an additional element corresponding to the additional text prompt.

Some examples of the method, apparatus, non-transitory computer readable medium, and system further include generating a plurality of intermediate image embeddings corresponding to a plurality of diffusion time steps, wherein the image is generated based on the plurality of intermediate image embeddings.

Some examples of the method, apparatus, non-transitory computer readable medium, and system further include obtaining a causal attention mask, wherein the image embedding is generated based on the causal attention mask.

Some examples of the method, apparatus, non-transitory computer readable medium, and system further include generating a plurality of image embeddings using the diffusion prior model. Some examples further include computing a similarity score between each of the plurality of image embeddings and the multilingual text embedding. Some examples further include selecting the image embedding from the plurality of image embeddings based on the similarity score.

In some aspects, the image embedding is in a same embedding space as the multilingual text embedding.

Figure 5:
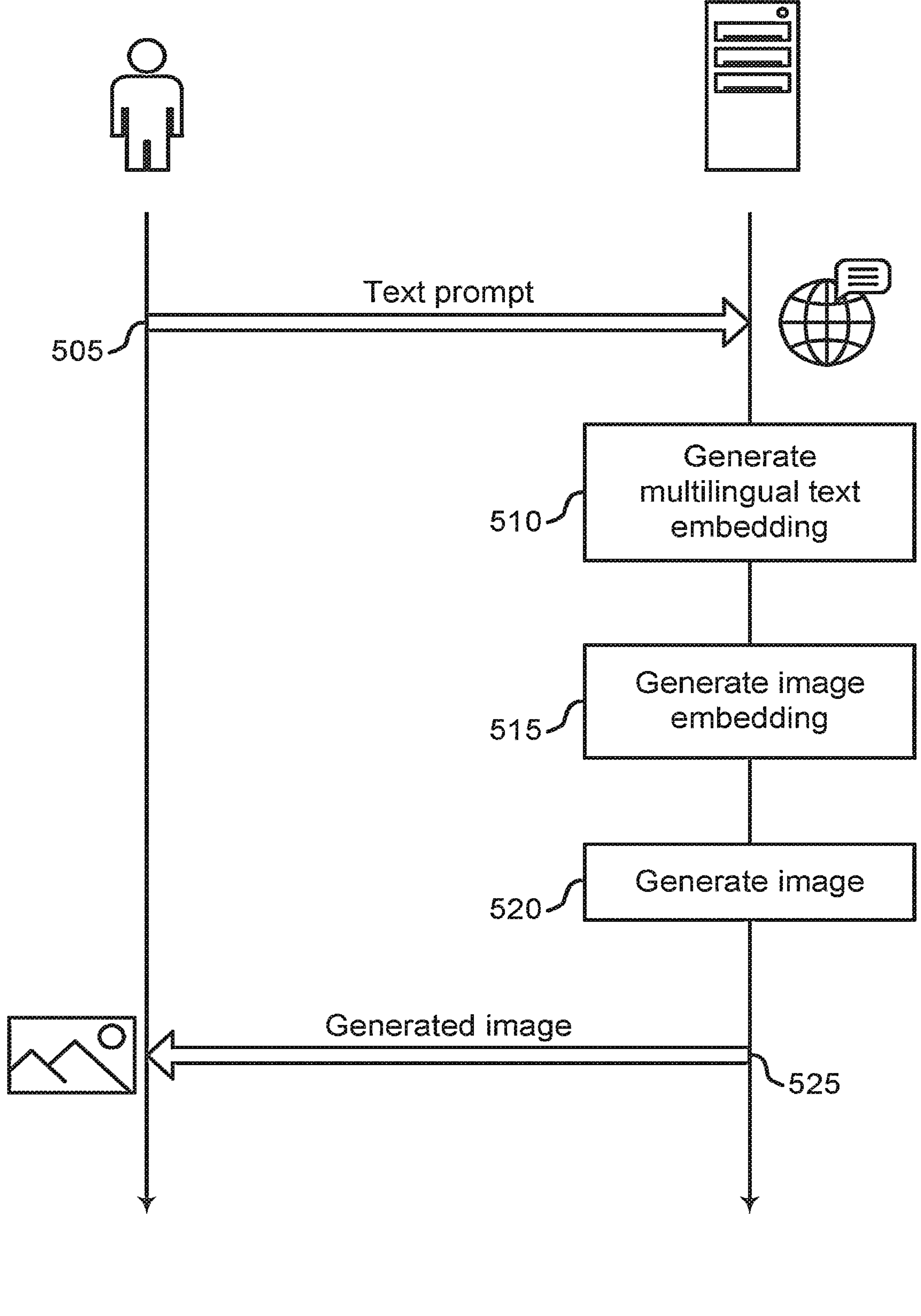
FIG. 5 shows an example of a method for image processing according to aspects of the present disclosure.

FIG. 5 shows an example of a method 500 for image processing according to aspects of the present disclosure. In some examples, the operations in method 500 are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, a user may provide a text prompt in a first language to an image processing apparatus. The first language may be one of multiple languages in which the user may provide a text prompt to the image processing apparatus. In some cases, the operations of this step refer to, or may be performed by, a user as described with reference to FIG. 1.

At operation 510, the image processing apparatus may generate a text embedding based on the text prompt obtained at operation 505. The text embedding may be a multilingual text embedding, and the image processing apparatus may encode the text prompt to obtain the multilingual text embedding. A multilingual text embedding may be a text embedding corresponding to one or more text prompts each written in any of multiple languages. In some cases, the operations of this step refer to, or may be performed by, a multilingual encoder described with reference to FIG. 2.

At operation 515, the image processing apparatus may generate an image embedding based on the text embedding from operation 510. In some examples, the image embedding is in a same embedding space as the text embedding. In some cases, the operations of this step refer to, or may be performed by, a diffusion prior model as described with reference to FIG. 2.

At operation 520, the image processing apparatus may generate an image based on the image embedding from operation 515. In some examples, the image embedding may be used as guidance for generating the image. In some cases, the operations of this step refer to, or may be performed by, a diffusion model as described with reference to FIG. 2.

At operation 525, the image processing apparatus may provide the generated image to the user that provided the text prompt at operation 505. In some cases, the operations of this step refer to, or may be performed by, an image processing apparatus as described with reference to FIGS. 1 and 2.

Figure 6:
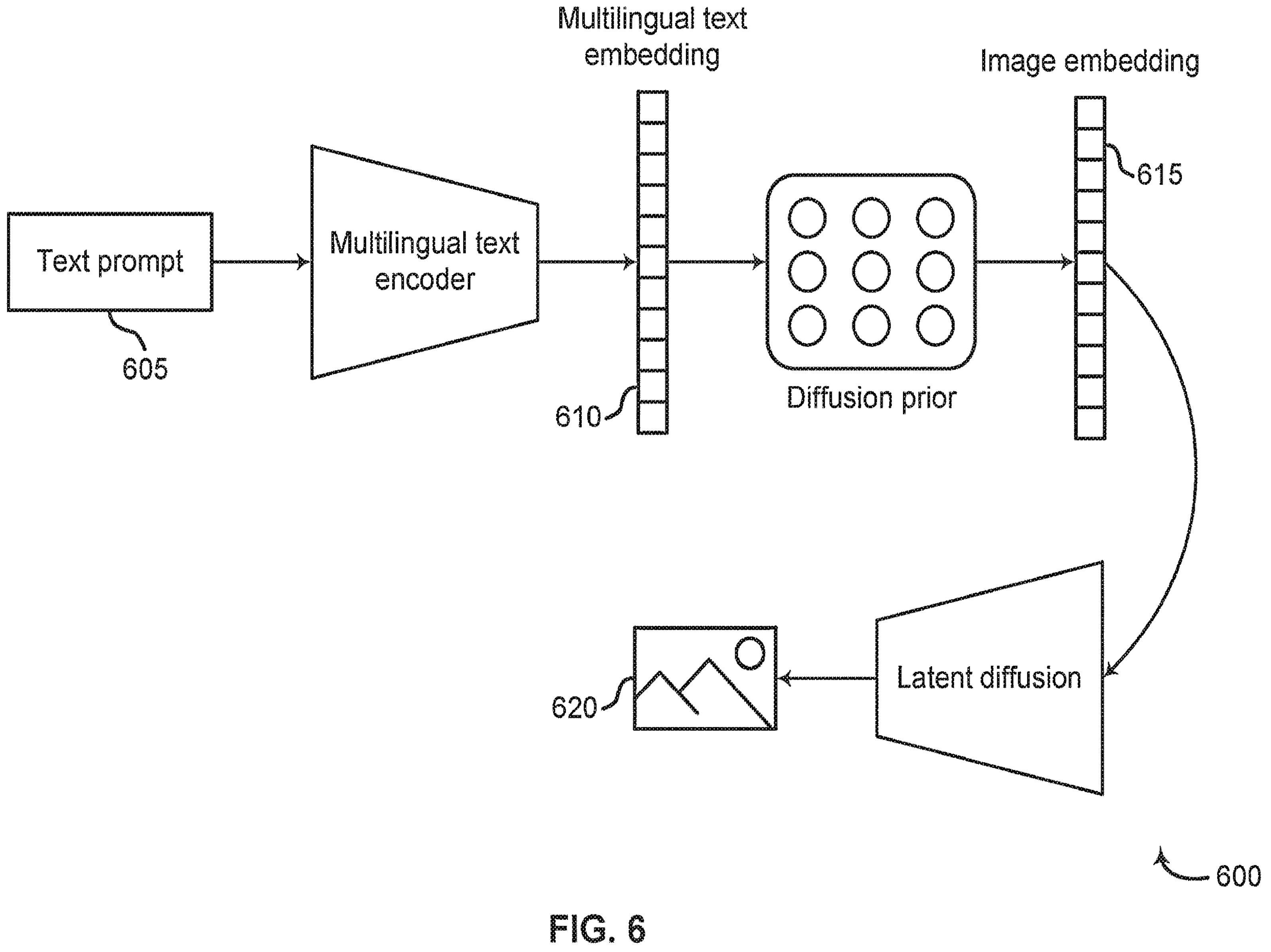
FIG. 6 shows an example of a process for image processing according to aspects of the present disclosure.

FIG. 6 shows an example of a process 600 for image processing according to aspects of the present disclosure. An image processing apparatus may implement the process 600, and the image processing apparatus may include a multilingual encoder, a diffusion prior model, and a diffusion model. The diffusion prior model may be trained to generate image embeddings based on text prompts written in multiple languages. The image processing apparatus may accept a text prompt written in any of the multiple languages and may generate an image based on the text prompt.

Several novel text to image generation models (e.g., DALL-E-2, Imagen, Parti) have been introduced that allow for image generation based on text prompts. In some examples, however, applications of these models may focus on generating images based on English prompts rather than prompts in other languages. In some examples, it may be appropriate for applications that support image generation to cater to non-English speaking users (e.g., users whose primary language is not English). An application that caters to these customers may be accessible to a wider range of users. Thus, some image generation models may allow for image generation based on text prompts written in multiple languages (e.g., English, German, French, Japanese).

In one approach, an image generation model may be trained for each language of a set of languages, and the image generation model trained for a particular language may be invoked when a text prompt written in that language is provided. However, this approach may not be scalable for one or more reasons. In some examples, the training of different image generation models for different languages may become intractable due to the computing costs of training (e.g., when the training data includes hundreds of millions of image caption pairs). In some examples, training data may not be readily available without expensive annotations to generate captions in each of the set of languages. In some examples, it may be expensive to deploy and host image generation models for a large set of languages. In some examples, results generated by image generation models trained in different languages may be inconsistent (e.g., if the underlying training data is different), which may lead to poor user experience.

In another approach (e.g., as described with reference to FIG. 6), a single image generation model may be trained for multiple languages, and the image generation model may generate images based on text prompts written in the multiple languages. The image generation model may be trained using parallel training captions in each of the multiple languages (e.g., a caption in English translated to multiple other languages). Because a single image generation model may be used to generate images based on text prompts written in multiple languages, the training of the image generation model may be more tractable, training data may be acquired with translations rather than annotations, deployment and hosting of the image generation model may be manageable, and results generated by the image generation model for different languages may be more consistent.

An image processing apparatus implementing the process 600 may be trained to predict conditional image embeddings based on multilingual, multimodal text embeddings. The training data used to train the image processing apparatus may include parallel captions across multiple languages (e.g., captions generated based on translating a caption into multiple languages). In an example, a translation service may be used to translate an English caption paired with an image to German, French, and Japanese captions. Because captions in other languages may be generated by translating a caption in English using a machine learning model, the quality of the captions in the other languages (e.g., the quality of the translations) may be imperfect. However, even with imperfections in the translations, the image processing apparatus may learn a consistent mapping from text embeddings to image embeddings (e.g., L/14 CLIP image embeddings).

A multilingual, multimodal encoder may be trained on image-text caption pairs across multiple languages. For instance, the multilingual, multimodal encoder (e.g., CLIP) may be trained on multiple languages, including English, German, Spanish, French, Chinese, Italian, Polish, Korean, Russian, Turkish, and Japanese. Because the multilingual, multimodal encoder may be trained in multiple languages (e.g., using a single encoder), the multilingual, multimodal encoder may be used to extract text embeddings for training a diffusion prior model. Further, because the multilingual, multimodal encoder may be trained in multiple languages, an image processing apparatus trained using the multilingual encoder (e.g., L/14 CLIP model) may also be multimodal and multilingual. The multilingual, multimodal model in FIG. 6 may correspond to any multilingual, multimodal model trained on image-text caption pairs across multiple languages.

A diffusion prior model (e.g., a diffusion model) used to generate image embeddings based on text embeddings may be a decoder Transformer with a causal attention mask that is trained on a sequence of inputs. The sequence of inputs may include, in order: a multilingual text embedding, an embedding for a diffusion time step, and a noised image embedding. At each diffusion time step, the diffusion prior model predicts an image embedding based on the sequence, and the predicted image embedding corresponds to an image embedding with at least some noise removed from the noised image embedding (e.g., a denoised image embedding). In some examples, image generation based on a final image embedding generated by a diffusion prior model may be internally implemented using a UNet architecture with positional encoding at each time step.

During inference, a multilingual text encoder may take a text prompt 605 as an input for generating an image. The text prompt may be an English prompt (e.g., "Tomato Garden"), a German prompt (e.g., "Tomatengarten"), or a text prompt in another language. The multilingual text encoder may generate a multilingual text embedding 610 corresponding to the text prompt 605. The diffusion prior model may generate an image embedding 615 based on the multilingual text embedding 610. In some examples, the diffusion prior model may generate multiple (e.g., 100) image embeddings based on the multilingual text embedding 610 (e.g., the text embedding extracted from the multilingual text encoder). In such examples, the image embedding 615 may be selected from the multiple image embeddings based on a cosine similarity between the image embedding 615 and the multilingual text embedding 610. In particular, an image embedding with a highest similarity score when compared to the multilingual text embedding 610 may be selected for generating an image. The image embedding 615 may then be used by a diffusion model (e.g., latent diffusion model) to generate an image 620. For example, the predicted image embedding may be used for decoding an image using a pretrained latent diffusion model which may be trained to generate images from image embeddings (e.g., L/14 CLIP image embeddings).

Figure 7:
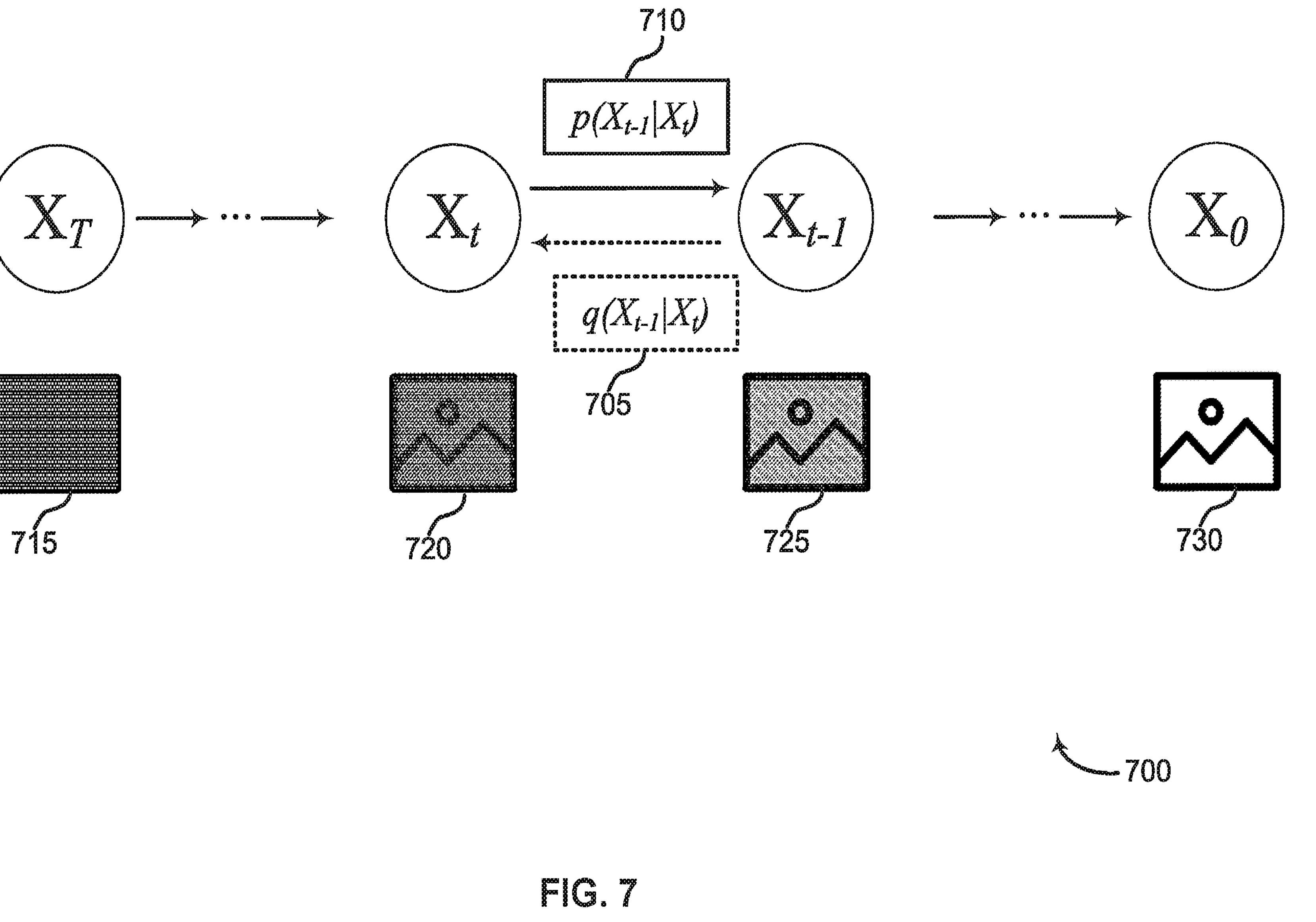
FIG. 7 shows a diffusion process according to aspects of the present disclosure.

FIG. 7 shows a diffusion process 700 according to aspects of the present disclosure. As described with reference to FIG. 4, a diffusion model can include both a forward diffusion process 705 for adding noise to an image (or features in a latent space) and a reverse diffusion process 710 for denoising the images (or features) to obtain a denoised image. The forward diffusion process 705 can be represented as $q(x_t|x_{t-1})$, and the reverse diffusion process 710 can be represented as $p(x_{t-1}|x_t)$. In some cases, the forward diffusion process 705 is used during training to generate images with successively greater noise, and a neural network is trained to perform the reverse diffusion process 710 (i.e., to successively remove the noise).

In an example forward process for a latent diffusion model, the model maps an observed variable $x_0$ (either in a pixel space or a latent space) to intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 710, the model begins with noisy data $x_T$, such as a noisy image 715 and denoises the data to obtain the $p(x_{t-1}|x_t)$. At each step t−1, the reverse diffusion process 710 takes $x_t$, such as first intermediate image 720, and t as input. Here, t represents a step in the sequence of transitions associated with different noise levels, The reverse diffusion process 710 outputs $x_{t-1}$, such as second intermediate image 725 iteratively until $x_T$ is reverted back to $x_0$, the original image 730. The reverse process can be represented as:

$$p_\theta(x_{t-1} \mid x_t) := N\left(x_{t-1}; \mu_\theta(x_t, t), \sum\nolimits_\theta(x_t, t)\right). \quad (1)$$

The joint probability of a sequence of samples in the Markov chain can be written as a product of conditionals and the marginal probability:

$$x_T: p_\theta(x_{0:T}) := p(x_T)\prod\nolimits_{t=1}^{T} p_\theta(x_{t-1} \mid x_t), \quad (2)$$

where $p(x_T)=N(x_T; 0, I)$ is the pure noise distribution as the reverse process takes the outcome of the forward process, a sample of pure noise, as input and $$\prod\nolimits_{t=1}^{T} p_\theta(x_{t-1} \mid x_t),$$

represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and x represents the generated image with high image quality.

Figure 8:
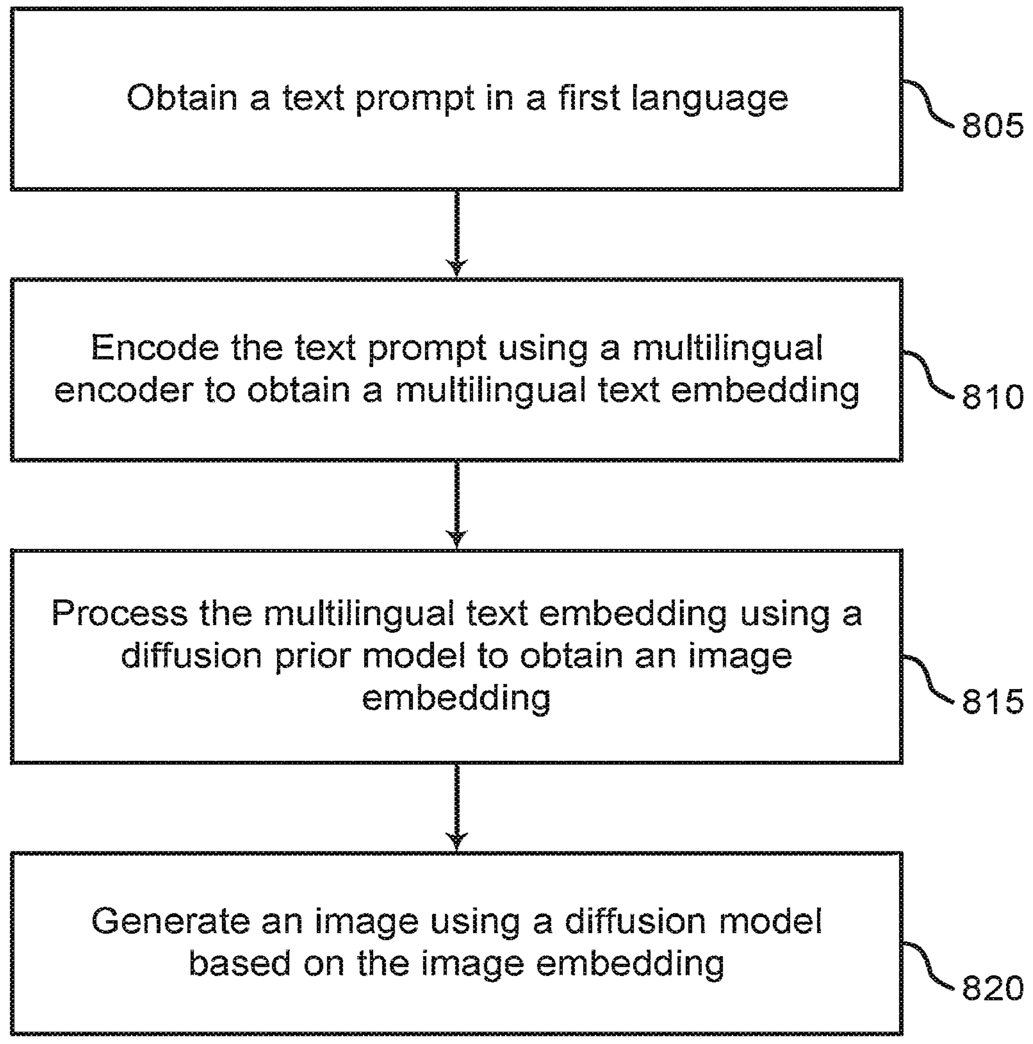
FIGS. 8 through 9 show examples of methods for machine learning according to aspects of the present disclosure.

FIG. 8 shows an example of a method 800 for machine learning according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains a text prompt in a first language. In some cases, the operations of this step refer to, or may be performed by, a multilingual encoder as described with reference to FIG. 2.

At operation 810, the system encodes the text prompt using a multilingual encoder to obtain a multilingual text embedding. In some cases, the operations of this step refer to, or may be performed by, a multilingual encoder as described with reference to FIG. 2.

At operation 815, the system processes the multilingual text embedding using a diffusion prior model to obtain an image embedding, where the diffusion prior model is trained to process multilingual text embeddings from the first language and a second language based on training data from the first language and the second language. In some cases, the operations of this step refer to, or may be performed by, a diffusion prior model as described with reference to FIG. 2.

At operation 820, the system generates an image using a diffusion model based on the image embedding, where the image includes an element corresponding to the text prompt. In some cases, the operations of this step refer to, or may be performed by, a diffusion model as described with reference to FIG. 2.

Figure 9:
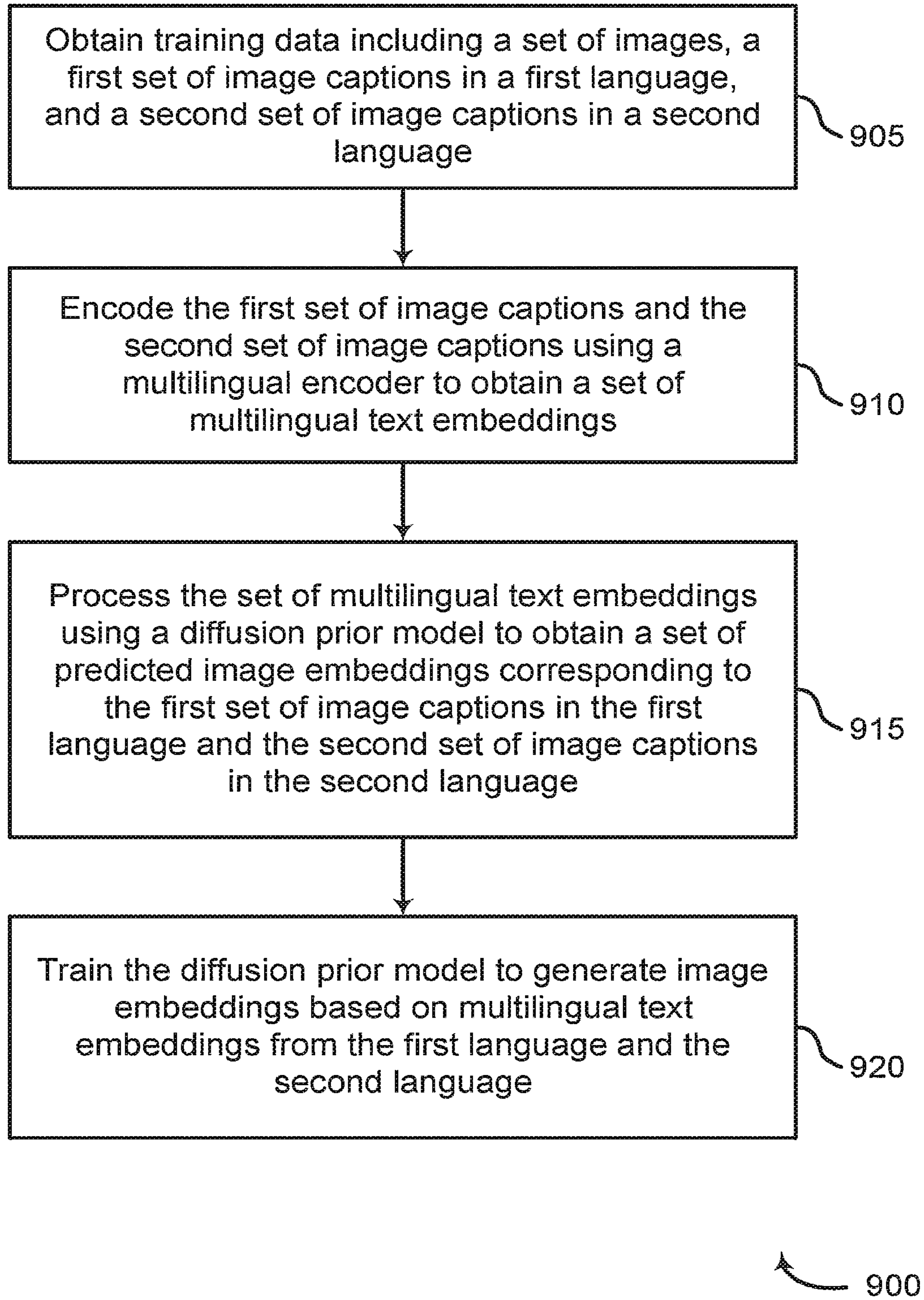

FIG. 9 shows an example of a method 900 for machine learning according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system obtains training data including a set of images, a first set of image captions in a first language, and a second set of image captions in a second language. In some cases, the operations of this step refer to, or may be performed by, a training component as described with reference to FIG. 2.

At operation 910, the system encodes the first set of image captions and the second set of image captions using a multilingual encoder to obtain a set of multilingual text embeddings. In some cases, the operations of this step refer to, or may be performed by, a multilingual encoder as described with reference to FIG. 2.

At operation 915, the system processes the set of multilingual text embeddings using a diffusion prior model to obtain a set of predicted image embeddings corresponding to the first set of image captions in the first language and the second set of image captions in the second language. In some cases, the operations of this step refer to, or may be performed by, a diffusion prior model as described with reference to FIG. 2.

At operation 920, the system trains the diffusion prior model to generate image embeddings based on multilingual text embeddings from the first language and the second language, where the diffusion prior model is trained based on the set of multilingual image embeddings and the set of images. In some cases, the operations of this step refer to, or may be performed by, a training component as described with reference to FIG. 2.

Training

Figure 10:
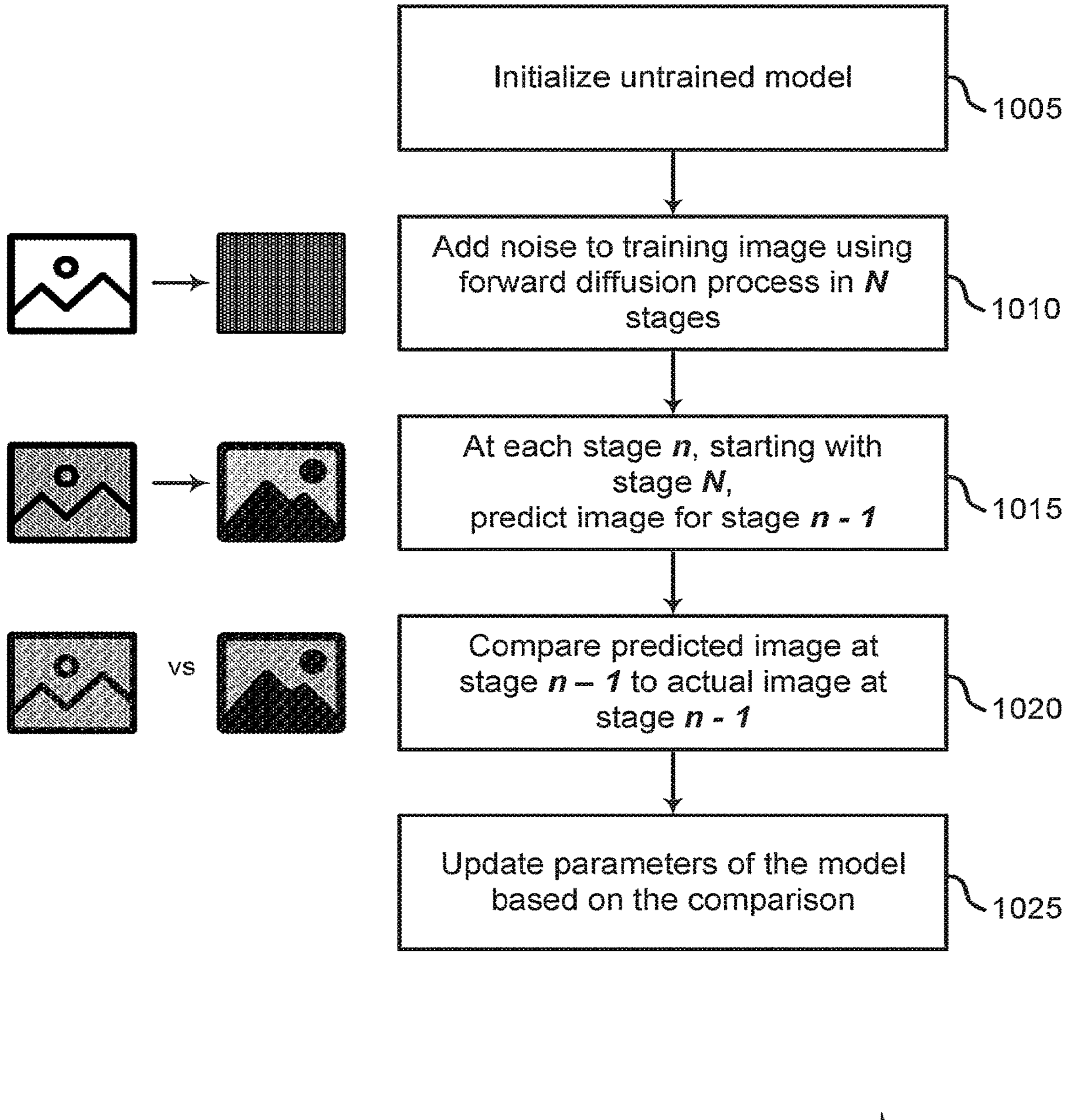
FIG. 10 shows an example of a method for training a diffusion model according to aspects of the present disclosure.
Figure 11:
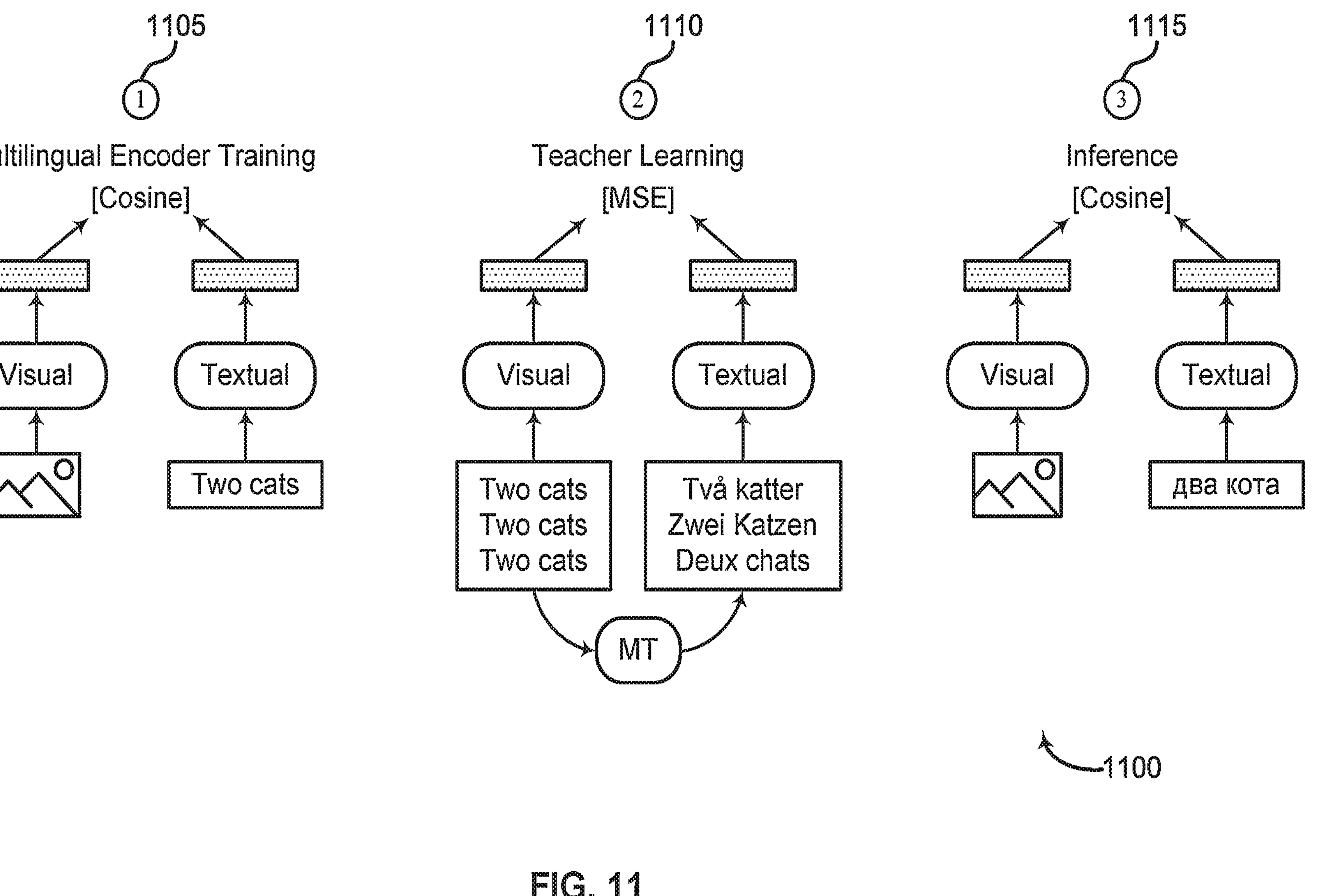
FIG. 11 shows an example of a method for training a multilingual encoder according to aspects of the present disclosure.

In FIGS. 10 and 11, a method, apparatus, non-transitory computer-readable medium, and system for machine learning for image processing are described. One or more aspects of the method, apparatus, non-transitory computer-readable medium, and system include obtaining training data including a plurality of images, a first plurality of image captions in a first language, and a second plurality of image captions in a second language; encoding the first plurality of image captions and the second plurality of image captions using a multilingual encoder to obtain a plurality of multilingual text embeddings; processing the plurality of multilingual text embeddings using a diffusion prior model to obtain a plurality of predicted image embeddings corresponding to the first plurality of image captions in the first language and the second plurality of image captions in the second language; and training the diffusion prior model to generate image embeddings based on multilingual text embeddings from the first language and the second language, wherein the diffusion prior model is trained based on the plurality of predicted image embeddings and the plurality of images.

Some examples of the method, apparatus, non-transitory computer readable medium, and system further include identifying a plurality of ground-truth image embeddings corresponding to the plurality of images, respectively. Some examples further include comparing the plurality of predicted image embeddings to the plurality of ground-truth image embeddings, wherein the diffusion prior model is trained based on the comparison.

Some examples of the method, apparatus, non-transitory computer readable medium, and system further include generating a plurality of predicted images based on the plurality of predicted image embeddings using a diffusion model. Some examples further include comparing the plurality of predicted images to the plurality of images, respectively, wherein the diffusion prior model is trained based on the comparison.

In some aspects, the diffusion model is pretrained prior to training the diffusion prior model.

Some examples of the method, apparatus, non-transitory computer readable medium, and system further include translating the first plurality of image captions to obtain the second plurality of image captions.

In some aspects, the plurality of images includes a first subset of images corresponding to the first language and a second subset of images corresponding to the second language, the first subset of images being different from the second subset of images.

In some aspects, the multilingual encoder is pretrained prior to training the diffusion prior model.

FIG. 10 shows an example of a method 1000 for training a diffusion model according to aspects of the present disclosure. The method 1000 represents an example for training a reverse diffusion process as described above with reference to FIG. 7. In some examples, these operations are performed by a system including a processor executing a set of codes to control functional elements of an apparatus, such as the apparatus described in FIG. 2.

Additionally, or alternatively, certain processes of method 1000 may be performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 1010, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 1015, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

At operation 1020, the system compares predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data.

At operation 1025, the system updates parameters of the model based on the comparison. For example, parameters of a U-Net may be updated using gradient descent. Time-dependent parameters of the Gaussian transitions can also be learned.

FIG. 11 shows an example of a method 1100 for training a multilingual encoder according to aspects of the present disclosure. In a first operation 1105, the multilingual encoder may be trained using training data including images paired with English captions. After the first operation 1105, the multilingual encoder may be able to generate similar embeddings for an image and an English caption corresponding to the image. In a second operation 1110, the multilingual encoder may be trained using training data including pairs of English captions and captions in other languages. That is, the multilingual encoder may be trained using training data in multiple languages. After the second operation 1110, the multilingual encoder may be able to generate similar embeddings for a same caption translated to the multiple languages. Then, in a third operation 1115 (e.g., during inference), the multilingual encoder may connect (e.g., associate) images with captions written in any of the multiple languages.

Figure 12:
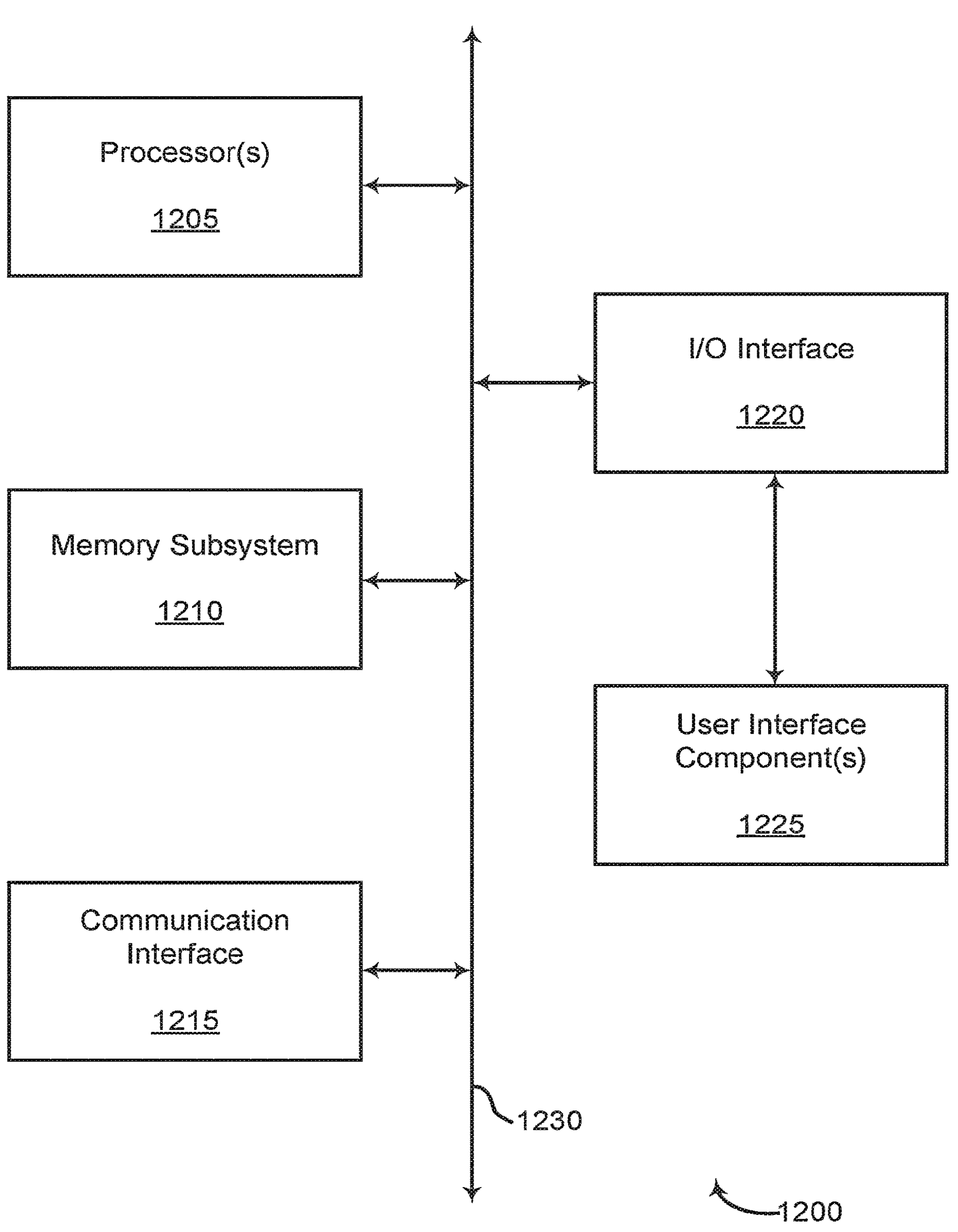
FIG. 12 shows an example of a computing device for image processing according to aspects of the present disclosure.

FIG. 12 shows an example of a computing device 1200 for image processing according to aspects of the present disclosure. In one aspect, computing device 1200 includes processor(s) 1205, memory subsystem 1210, communication interface 1215, I/O interface 1220, user interface component(s) 1225, and channel 1230.

In some embodiments, computing device 1200 is an example of, or includes aspects of, image processing apparatus 200 of FIG. 2. In some embodiments, computing device 1200 includes one or more processors 1205 that can execute instructions stored in memory subsystem 1210 for obtaining a text prompt in a first language; encoding the text prompt using a multilingual encoder to obtain a multilingual text embedding; process the multilingual text embedding using a diffusion prior model to obtain an image embedding, wherein the diffusion prior model is trained to process multilingual text embeddings from the first language and a second language based on training data from the first language and the second language; and generating an image using a diffusion model based on the image embedding, wherein the image includes an element corresponding to the text prompt.

According to some aspects, computing device 1200 includes one or more processors 1205. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1215 operates at a boundary between communicating entities (such as computing device 1200, one or more user devices, a cloud, and one or more databases) and channel 1230 and can record and process communications. In some cases, communication interface 1215 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1220 is controlled by an I/O controller to manage input and output signals for computing device 1200. In some cases, I/O interface 1220 manages peripherals not integrated into computing device 1200. In some cases, I/O interface 1220 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1220 or via hardware components controlled by the I/O controller.

According to some aspects, user interface component(s) 1225 enable a user to interact with computing device 1200. In some cases, user interface component(s) 1225 include an audio device, such as an external speaker system, an external display device such as a display screen, an input device (e.g., a remote-control device interfaced with a user interface directly or through the I/O controller), or a combination thereof. In some cases, user interface component(s) 1225 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining a text prompt in a first language;

encoding the text prompt using a multilingual encoder to obtain a multilingual text embedding;

processing the multilingual text embedding using a diffusion prior model to obtain an image embedding, wherein the diffusion prior model is trained to perform denoising based on multilingual text embeddings from the first language and a second language to obtain input guidance for an image generation model different from the diffusion prior model, and wherein the diffusion prior model is trained based on training data from the first language and the second language; and generating an image using the image generation model by performing denoising based on the image embedding, wherein the image includes an element corresponding to the text prompt.

2. The method of claim 1, further comprising:

obtaining an additional text prompt in the second language;

encoding the additional text prompt using the multilingual encoder to obtain an additional multilingual text embedding;

processing the additional multilingual text embedding using the diffusion prior model to obtain an additional image embedding; and generating an additional image using the diffusion model based on the additional image embedding, wherein the additional image includes an additional element corresponding to the additional text prompt.

3. The method of claim 1, further comprising:

generating a plurality of intermediate image embeddings corresponding to a plurality of diffusion time steps, wherein the image is generated based on the plurality of intermediate image embeddings.

4. The method of claim 1, further comprising:

obtaining a causal attention mask, wherein the image embedding is generated based on the causal attention mask.

5. The method of claim 1, further comprising:

generating a plurality of image embeddings using the diffusion prior model;

computing a similarity score between each of the plurality of image embeddings and the multilingual text embedding; and selecting the image embedding from the plurality of image embeddings based on the similarity score.

6. The method of claim 1, wherein:

the image embedding is in a same embedding space as the multilingual text embedding.

7. A method comprising:

obtaining training data including a plurality of images, a first plurality of image captions in a first language, and a second plurality of image captions in a second language;

encoding the first plurality of image captions and the second plurality of image captions using a multilingual encoder to obtain a plurality of multilingual text embeddings;

processing the plurality of multilingual text embeddings using a diffusion prior model to obtain a plurality of predicted image embeddings corresponding to the first plurality of image captions in the first language and the second plurality of image captions in the second language to obtain input guidance for an image generation model different from the diffusion prior model, and wherein the diffusion prior model is trained based on training data from the first language and the second language; and training the diffusion prior model to generate image embeddings based on multilingual text embeddings from the first language and the second language, wherein the diffusion prior model is trained based on the plurality of predicted image embeddings and the plurality of images.

8. The method of claim 7, further comprising:

identifying a plurality of ground-truth image embeddings corresponding to the plurality of images, respectively; and comparing the plurality of predicted image embeddings to the plurality of ground-truth image embeddings, wherein the diffusion prior model is trained based on the comparison.

9. The method of claim 7, further comprising:

generating a plurality of predicted images based on the plurality of predicted image embeddings using a diffusion model; and comparing the plurality of predicted images to the plurality of images, respectively, wherein the diffusion prior model is trained based on the comparison.

10. The method of claim 9, wherein:

the diffusion model is pretrained prior to training the diffusion prior model.

11. The method of claim 7, further comprising:

translating the first plurality of image captions to obtain the second plurality of image captions.

12. The method of claim 7, wherein:

the plurality of images includes a first subset of images corresponding to the first language and a second subset of images corresponding to the second language, the first subset of images being different from the second subset of images.

13. The method of claim 7, wherein:

the multilingual encoder is pretrained prior to training the diffusion prior model.

14. A system comprising:

at least one memory component; and at least one processing device coupled to the at least one memory component, wherein the processing device is configured to execute instructions stored in the at least one memory component to perform operations comprising:

processing, using a diffusion prior model, a multilingual text embedding from a first language to obtain an image embedding, wherein the diffusion prior model is trained to perform denoising based on multilingual text embeddings from the first language and a second language to obtain input guidance for an image generation model different from the diffusion prior model, and wherein the diffusion prior model is trained based on training data from the first language and the second language; and generating, using the image generation model comprising a diffusion model, an image by performing denoising based on the image embedding, wherein the image includes an element corresponding to the multilingual text embedding.

15. The system of claim 14, wherein the at least one processing device is configured to execute instructions stored in the at least one memory component to perform operations comprising:

encoding, using a multilingual encoder, a text prompt in the first language to obtain the multilingual text embedding.

16. The system of claim 15, wherein the multilingual encoder comprises a multimodal encoder for text and images.

17. The system of claim 14, wherein the at least one processing device is configured to execute instructions stored in the at least one memory component to perform operations comprising:

training the diffusion prior model to generate image embeddings based on multilingual text embeddings from the first language and the second language, wherein the diffusion prior model is trained based on a plurality of predicted images.

18. The system of claim 14, wherein:

the image embedding is in a same embedding space as the multilingual text embedding.

19. The system of claim 14, wherein the diffusion prior model comprises a transformer architecture.

20. The system of claim 14, wherein the diffusion model comprises a UNet architecture.

* * * * *